US010737784B2

(12) United States Patent
Pogorelik et al.

(10) Patent No.: US 10,737,784 B2
(45) Date of Patent: Aug. 11, 2020

(54) DRONES AND METHODS TO DELIVER PAYLOADS TO PRIVATE LOCATIONS

(71) Applicant: Intel Corporation, Santa Clara, CA (US)

(72) Inventors: Oleg Pogorelik, Lapid (IL); Glen J. Anderson, Beaverton, OR (US); Alex Nayshtut, Gan Yavne (IL); Carl Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 16/024,293

(22) Filed: Jun. 29, 2018

(65) Prior Publication Data

US 2019/0202556 A1    Jul. 4, 2019

(30) Foreign Application Priority Data

Dec. 28, 2017 (IL) .......................................... 256658

(51) Int. Cl.
| | | |
|---|---|---|
| *B64C 39/02* | (2006.01) | |
| *G05D 1/00* | (2006.01) | |
| *G05D 1/10* | (2006.01) | |
| *H04L 9/30* | (2006.01) | |
| *H04L 9/14* | (2006.01) | |
| *G06K 9/00* | (2006.01) | |
| *H04N 5/225* | (2006.01) | |
| *G06K 9/32* | (2006.01) | |
| *G06Q 50/28* | (2012.01) | |

(52) U.S. Cl.
CPC ......... *B64C 39/024* (2013.01); *G05D 1/0088* (2013.01); *G05D 1/101* (2013.01); *G06K 9/00637* (2013.01); *G06K 9/00664* (2013.01); *G06K 9/3216* (2013.01); *H04L 9/14* (2013.01); *H04L 9/30* (2013.01); *H04N 5/2253* (2013.01); *B64C 2201/128* (2013.01); *B64C 2201/141* (2013.01); *G06Q 50/28* (2013.01)

(58) Field of Classification Search
None
See application file for complete search history.

(56) References Cited

U.S. PATENT DOCUMENTS 9,359,074 B2 * 6/2016 Ganesh ................. B64C 39/024
10,460,280 B2 * 10/2019 Lection ................. B64D 45/08

OTHER PUBLICATIONS

Sanchez-Lopez et al., "Visual Quadrotor Swarm for IMAV 2013 Indoor Competition", presented in Toulouse, France, at International Micro Air Vehicle Conference and Flight Competition (IMAV2013), on Sep. 17-20, 2013, 9 pages.

* cited by examiner

*Primary Examiner* — Abdhesh K Jha
(74) *Attorney, Agent, or Firm* — Hanley, Flight & Zimmerman, LLC

(57) ABSTRACT

Private delivery drones and methods are disclosed. An example drone includes a first communication interface to receive a first input from a sender representing a delivery area for a payload, a second communication interface to receive a second input from a recipient representing a visual marker of the recipient, the visual marker unknown to the sender, a drone controller to, when the drone reaches the delivery area, visually identify a location in the delivery area to deliver the payload based on the visual marker, and a carrier to deliver the payload to the location.

24 Claims, 4 Drawing Sheets

DRONES AND METHODS TO DELIVER PAYLOADS TO PRIVATE LOCATIONS

RELATED APPLICATIONS

This patent claims priority to Israel Patent Application No. 256658, filed on Dec. 28, 2017, and which is incorporated herein by reference in its entirety.

FIELD OF THE DISCLOSURE

This disclosure relates generally to drones, and, more particularly, to drones and methods to deliver payloads to private locations.

BACKGROUND

In recent years, there is growing interest in the use of unmanned aerial vehicles (e.g., drones) to deliver payloads to remote locations. For example, to delivery items purchased from a retailer to the purchaser.

Figure 1:
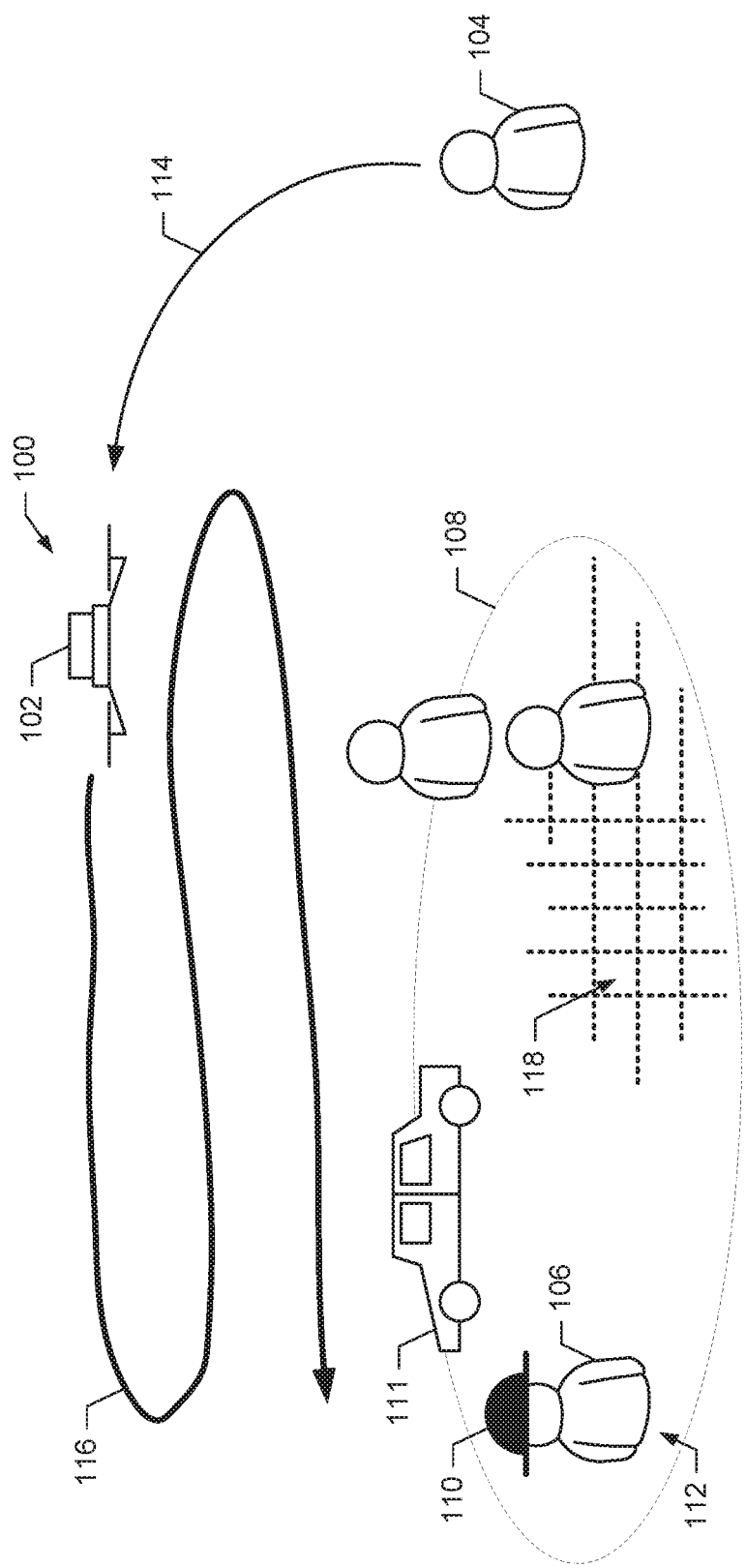
FIG. 1 illustrates an example drone constructed in accordance with teachings of this disclosure, and shown in an example environment of use.

In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

In some examples, an actual delivery location for a payload is not known when a drone carrying the payload is launched. For example, a recipient of the payload may be mobile (e.g., moving). In some examples, the recipient may prefer, or need to keep their actual delivery location private (e.g., unknown, covert, obscured, undisclosed, hidden, etc.). In some examples, the recipient is interested in protecting their privacy (e.g., by keeping others from knowing or being able to know the recipient's location). Known drone delivery solutions require the recipient to contact the operator of the drone when the recipient sees the drone and specify a precise delivery location, use dedicated equipment such as Wi-Fi or a light beacon to direct the drone to a precise delivery location, or take over control of the drone and navigate the drone to the precise delivery location. All these known examples are complicated, require manual operations, and/or require additional equipment. Example drones and methods to deliver payloads to private and/or changeable locations disclosed herein overcome at least these challenges. Examples disclosed herein enable a recipient to provide one or more visual markers (e.g., a black hat, a car, a bridge over a stream, a boat in a lake, etc.) that a drone can visually locate within a rough delivery area (e.g., a park, a portion of a city, etc.) to identify an actual delivery location for a payload. To provide privacy in some examples, the sender of the payload is prevented from knowing the visual marker(s). Disclosed examples provide privacy protection (e.g., by keeping others from knowing or being able to know the recipient's location) for drone delivery services that are simpler than existing solutions, don't require additional equipment, and can address destinations that are near to each other (e.g., co-located). While examples described herein refer to unmanned aerial vehicles (e.g., drones), teachings of this disclosure can be used to make deliveries to changeable and/or private locations using other forms of unmanned and/or autonomous devices such as mobile robots.

Reference will now be made in detail to non-limiting examples, some of which are illustrated in the accompanying drawings.

FIG. 1 illustrates an example drone 100 constructed in accordance with teachings of this disclosure, and shown in an example environment of use. In the illustrated example of FIG. 1, the example drone 100 transports an example payload 102 (e.g., object, box, package, mail, etc.) from an example sender 104 to an example recipient 106. Example senders 104 include an individual, a residence, a business, etc. that originate a payload for delivery. Additional example senders 104 include a delivery company, a shipper, a drone operator, etc. that deliver, ship, transport, etc. a payload on behalf of another party such as a payload originator. Further example senders 104 include entities that both originate a payload and deliver the payload. Example recipients 106 include an individual, a residence, a business, a school, a delivery platform with an emblem, a box, etc.

When the recipient 106 orders (e.g., purchases, requests, etc.) the payload 102, the recipient 106 indicates a rough delivery area 108 (e.g., a park, a neighborhood, a portion of a city, etc.), and example visual marker(s) 202 (FIG. 2) (e.g., a black hat 110, a red car 111, a bridge over a stream, a boat in a lake, etc.) that the drone 100 is to use to determine an actual delivery location 112 for the recipient 106. The example visual marker(s) 202 are a unique, but anonymous attribute or combination of attributes valid only for, for example, a period of time necessary to deliver the payload 102. Example visual marker(s) 202 for FIG. 1 indicate that the recipient 106 is near the red car 111 and is wearing the black hat 110. In some examples, the visual marker(s) 202 are provided separate from the indication of the rough delivery area 108 (e.g., in a separate transaction). In some examples, the visual marker(s) 202 are provided by the recipient 106 and are unknown to the sender 104. For example, the visual marker(s) 202 can be provided in an encrypted form by the recipient 106.

When the sender 104 sends the payload 102, the sender 104 configures the drone 100 with the rough delivery area 108, and the example visual markers 202 (e.g., recipient 106 is near the red car 111 and is wearing the black hat 110). After configuration, the sender 104 launches the drone 100.

In a first phase, the drone 100 flies 114 to the rough delivery area 108. In a second phase, when the example drone 100 of FIG. 1 arrives at the rough delivery area 108, the drone 100 automatically performs an aerial visual search 116 of the rough delivery area 108 for the visual marker(s) 202. When the visual marker(s) 202 (e.g., a person wearing the black hat 110 near the red car 111) are found, the example drone 100 approaches the recipient 106, or a location 112 near the recipient 106, to deliver the payload 102.

Figure 2:
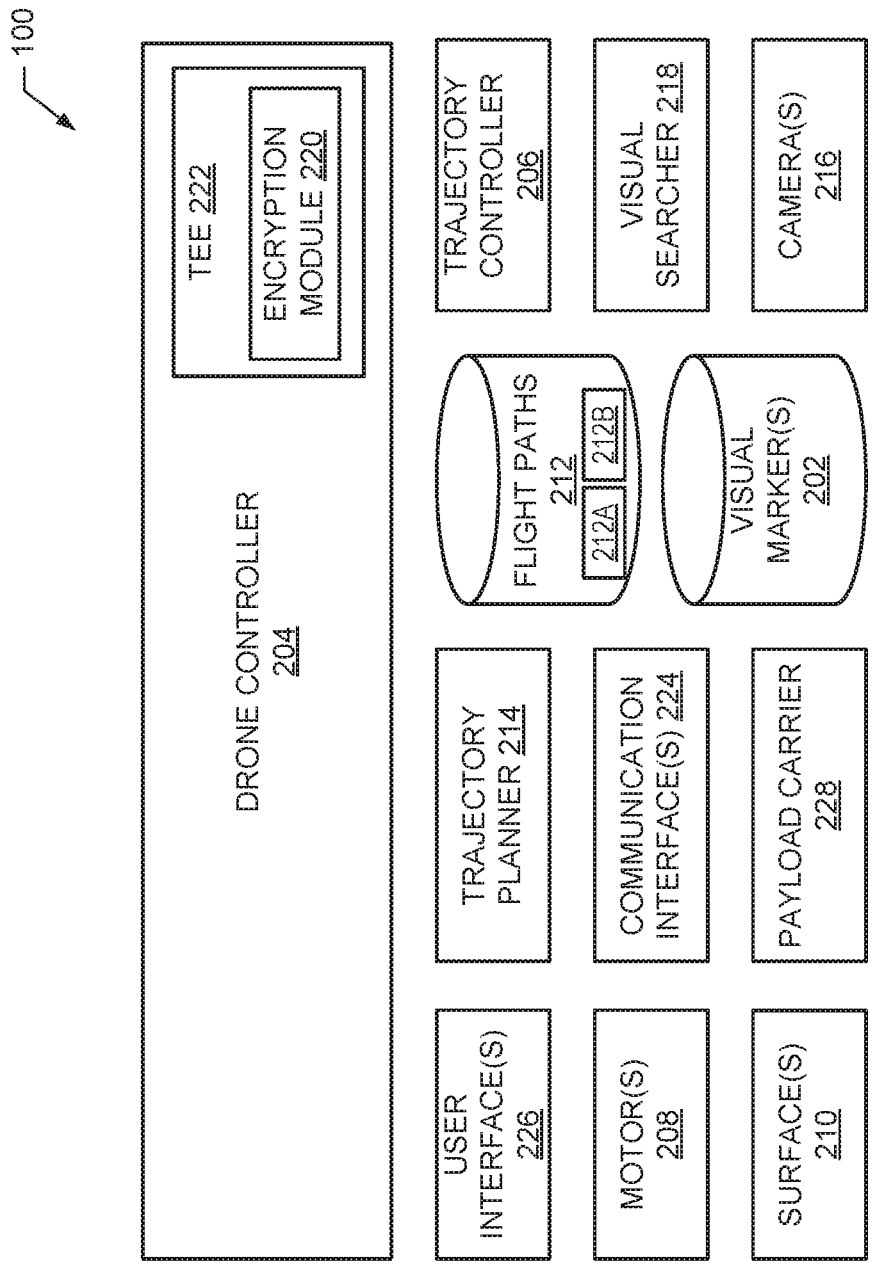
FIG. 2 is a block diagram illustrating an example implementation for the example drone of FIG. 1.

FIG. 2 is a block diagram illustrating an example implementation for the example drone 100 of FIG. 1. To control the overall operation(s) of the drone 100, the example drone 100 of FIG. 2 includes an example drone controller 204. Among other functionalities, the example drone controller 204 of FIG. 1 changes the drone 100 from a conventional flight control mode used to fly the drone 100 during phase 1 to the rough delivery area 108, and, in phase 2, a search flight control mode to perform the aerial visual search 116 of the rough delivery area 108 for the visual marker(s) 202.

To control the flight of the drone 100, the example drone 100 of FIG. 2 includes an example trajectory controller 206. The example trajectory controller 206 of FIG. 2 controls flight elements (e.g., motor(s) 208, flight control surface(s) 210, etc.) of the drone 100 to fly the drone 100 along a flight path 212. The example flight paths 212 of FIG. 2 include a flight path 212A, for phase 1, from the sender 104 to the rough delivery area 108, and a flight path 212B, for phase 2, to perform the aerial visual search 116 of the rough delivery area 108 for the visual marker(s) 202. The example flight paths 212, 212A and 212B can be stored using any number and/or type(s) of data structures in any number and/or type(s) of computer-readable storage device(s) or memory(-ies).

To form (e.g., generate, calculate, etc.) the flight paths 212, 212A and 212B, the example drone 100 of FIG. 2 includes an example trajectory planner 214. Using any number and/or type(s) of method(s), algorithm(s), technique(s), etc., the example trajectory planner 214 of FIG. 2 forms the search flight path 212B to methodically search all the rough delivery area 108 with a plurality of flight crossing the rough delivery area 108. In some examples, the trajectory planner 214 forms the search flight path 212B to include hovering over regions 118 (FIG. 1) of the rough delivery area 108 to perform visual recognition. In some examples, visual recognition is performed without hovering. In some examples, the trajectory planner 214 forms the flight path 212A to the rough delivery area 108. In some examples, the sender 104 provides the flight path 212A to the drone 100 before the drone 100 is launched.

To identify the visual marker(s) 202 (e.g., objects, persons, etc.) in the example rough delivery area 108, the example drone 100 of FIG. 2 includes one or more example onboard (e.g., on the drone 100) cameras 216, and an example onboard visual searcher 218. As the drone 100 flies the search flight path 212B, or hovers during the search flight path 212B, the example camera(s) 216 collects visual information for the rough delivery area 108 (e.g., captures one or more pictures of the rough delivery area 108). Example cameras 216 include a visible light camera, an infrared light camera, etc.

Using any number and/or type(s) of method(s), algorithm(s), technique(s), etc., the example visual searcher 218 performs object rejection on the visual information (e.g., pictures) captured by the camera(s) 216 to determine whether any of the visual marker(s) 202 appear in the visual information. In some examples, the visual searcher 218 applies semantics to any relational aspects of the visual marker(s) 202 (e.g., near to, beside, on top of, etc.) to identify the actual delivery location 112. In some examples, the onboard video systems of known drones, e.g., based on an Intel® RealSense™ camera, are used to implement onboard video processing to perform object, person, etc. recognition to implement the example camera(s) 216 and visual searcher 218. The example visual marker(s) 202 can be stored using any number and/or type(s) of data structures in any number and/or type(s) of computer-readable storage device(s) or memory(-ies).

In some examples, to securely communicate with the recipient 106, the example drone 100 of FIG. 2 includes an example encryption module 220. The example encryption module 220 of FIG. 2 generates a private-public cryptographic key pair. The sender 104 uses the public key to encrypt the visual marker(s) 202 before sending the visual marker(s) 202 to the drone 100 via the sender 104. The encryption module 220 uses the private key to decrypt the encrypted visual marker(s) 202. Using encryption, the sender 104 is cryptographically prevented from knowing the visual marker(s) 202 and, thus, unable to determine the actual delivery location 112 for the payload 102. In the illustrated example of FIG. 2, the encryption module 220 is implemented in a trusted execution environment (TEE) 222 of the drone controller 204.

To communicatively couple the drone 100 to other devices, the example drone 100 of FIG. 2 includes any number and/or type(s) of communication interface(s) 224. The communication interface(s) 224 of FIG. 2 can be used to communicate with the sender 104 (e.g., to receive the flight path 212A, etc.), with the recipient 106 (e.g., to receive the visual marker(s) 202, etc.), etc. Example communication interface(s) include interfaces to an Ethernet system, a satellite system, a line-of-site wireless system, a cellular telephone system, a Wi-Fi system, etc. Example interfaces also include a universal serial bus (USB), a Bluetooth® interface, a near field communication (NFC) interface, etc.

To enable a user to interact with the drone 100, the example drone 100 of FIG. 2 includes any number and/or type(s) of user interface(s) 226. An example user interface 226 includes a keypad that the recipient 106 uses to type in a unique user identifier that confirms their identity. Other example user interfaces 226 include interfaces for making payment at delivery, etc.

To carry the example payload 102, the example drone 100 of FIG. 1 includes an example carrier 228. The example carrier 228 of FIG. 2 has any shape, size, configuration suitable for securing the payload 102 during flight and protecting the payload 102 from the environment.

While an example manner of implementing the example drone 100 of FIG. 1 is illustrated in FIG. 2, one or more of the elements, processes and/or devices illustrated in FIG. 2 may be combined, divided, re-arranged, omitted, eliminated and/or implemented in any other way. Further, the example drone controller 204, the example trajectory controller 206, the example trajectory planner 214, the example visual searcher 218, the example encryption module 220, the example communication interface(s) 224, the example user interface(s) 226 and/or, more generally, the example drone 100 of FIG. 2 may be implemented by hardware, software, firmware and/or any combination of hardware, software and/or firmware. Thus, for example, any of the example drone controller 204, the example trajectory controller 206, the example trajectory planner 214, the example visual searcher 218, the example encryption module 220, the example communication interface(s) 224, the example user interface(s) 226 and/or, more generally, the example drone 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example drone controller 204, the example trajectory controller 206, the example trajectory planner 214, the example visual searcher 218, the example encryption module 220, the example communication interface(s) 224, the example user interface(s) 226 and/or the example drone 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example drone 100 of FIG. 2 may include one or more elements, processes and/or devices in addition to, or instead of, those illustrated in FIG. 2, and/or may include more than one of any or all the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
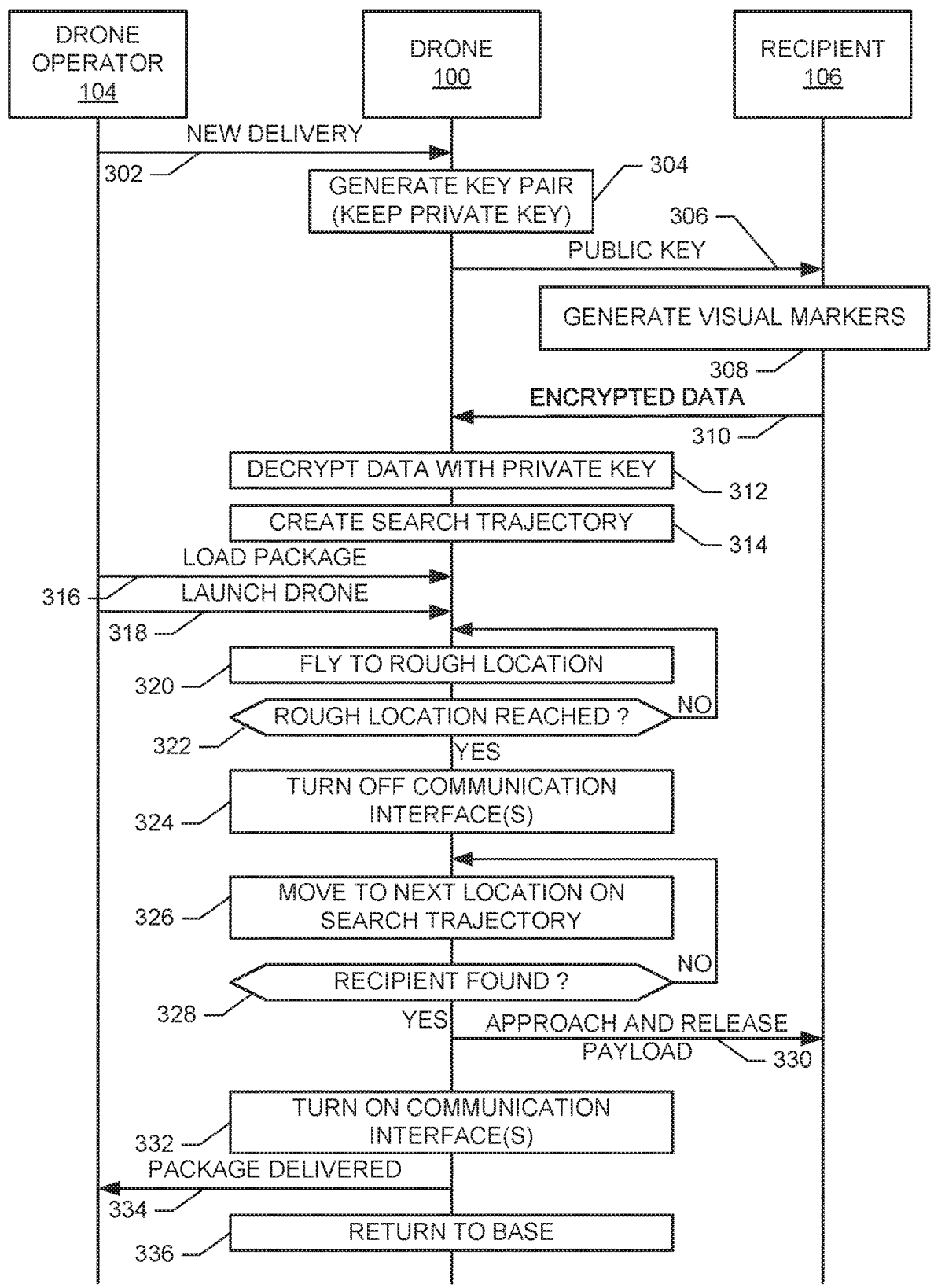
FIG. 3 is a flowchart representative of example hardware logic or machine-readable instructions for implementing the example drone of FIGS. 1 and/or 2.

A flowchart representative of example hardware logic or machine-readable instructions and example interactions with the sender 104 for implementing the drone 100 of FIGS. 1 and/or 2 is shown in FIG. 3. The machine-readable instructions may be a program or portion of a program for execution by a processor such as the processor 410 shown in the example processor platform 400 discussed below in connection with FIG. 4. The program may be embodied in software stored on a non-transitory computer-readable storage medium such as a compact disc read-only memory (CD-ROM), a floppy disk, a hard drive, a DVD, a Blu-ray disk, or a memory associated with the processor 410, but the entire program and/or parts thereof could alternatively be executed by a device other than the processor 410 and/or embodied in firmware or dedicated hardware. Further, although the example program is described with reference to the flowchart illustrated in FIG. 4, many other methods of implementing the example drone 100 may alternatively be used. For example, the order of execution of the blocks described may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transdrone media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program of FIG. 3 begins with the drone 100 receiving an indication (line 302) of a new delivery from a sender in the form of a done operator 104. In the illustrated example of FIG. 3, the indication (line 302) includes the flight plan 212A for the rough delivery location 108, or information from which the trajectory planner 214 can determine the flight plan 212A. In some examples, the recipient 106 provides the rough delivery location 108 to the done operator 104 during an order creation process The encryption module 220 of the drone 100 creates a private-public encryption key pair (block 304). The encryption module 220 sends the public key 306 to the done operator 104, which forwards the public key 306 to the recipient 106. The encryption module 220 retains the private key for use in decrypting inputs from the recipient 106. The recipient 106 generates visual marker(s) 202 that direct the drone 100 to the actual delivery location 112 (block 308). The recipient 106 encrypts the visual marker(s) 202 with the public key 306, and sends the encrypted visual marker(s) (line 310) to the drone 100. In some examples, the drone 100 provides the encrypted visual marker(s) 202 (line 310) to the drone operator 104, which forwards the encrypted visual marker(s) 202 to the recipient 106, thereby avoiding the need for communications between the recipient 106 and the drone 100. Because the drone operator 104 does not know the private key it cannot decrypt the encrypted visual marker(s) 202, thus, protecting the privacy of the recipient's actual delivery location 112.

The encryption module 220 decrypts the encrypted visual marker(s) 310 with the private key (block 312), and the trajectory planner 214 forms the search flight path 212B based on the decrypted visual marker(s) 202 (block 314). In some examples when privacy is not needed, encryption/decryption can be omitted, and the done operator 104 can form and provide the search flight path 212B to the drone 100.

The done operator 104 loads (line 316) the payload 102, and launches (line 318) the drone 100. In phase 1, the drone 100 flies the flight path 212A (block 320) until the rough delivery location 108 is reach (block 322).

In phase 2, one or more of the communication interface(s) 224 are turned off, or disabled (block 324) to prevent the done operator 104 from determining (e.g., tracking, etc.) the location of the drone 100. In some examples when privacy is not needed, the communications interfaces(s) 224 can be left on, or enabled. The trajectory controller 206 moves the drone 100 to a first search location in the rough delivery area 108 (block 326), and the visual searcher 218 searches visually for the visual marker(s) 202 at the first search location (block 328). If the search found the recipient 106 (block 328), the drone 100 approaches the actual delivery location 112 and the payload carrier 228 releases the payload 102 (line 330). If the recipient 106 was not found (block 328), the trajectory controller 206 moves the drone 100 to a next search location in the rough delivery area 108 (block 326).

After the payload 102 is released (line 330), the communications interfaces(s) 224 are turned on, or re-enabled (block 332). After first leaving the area (in some examples), the drone 100 notifies the done operator 104 that the payload 102 was delivered (line 334), and the drone 100 returns to base (block 336).

Figure 4:
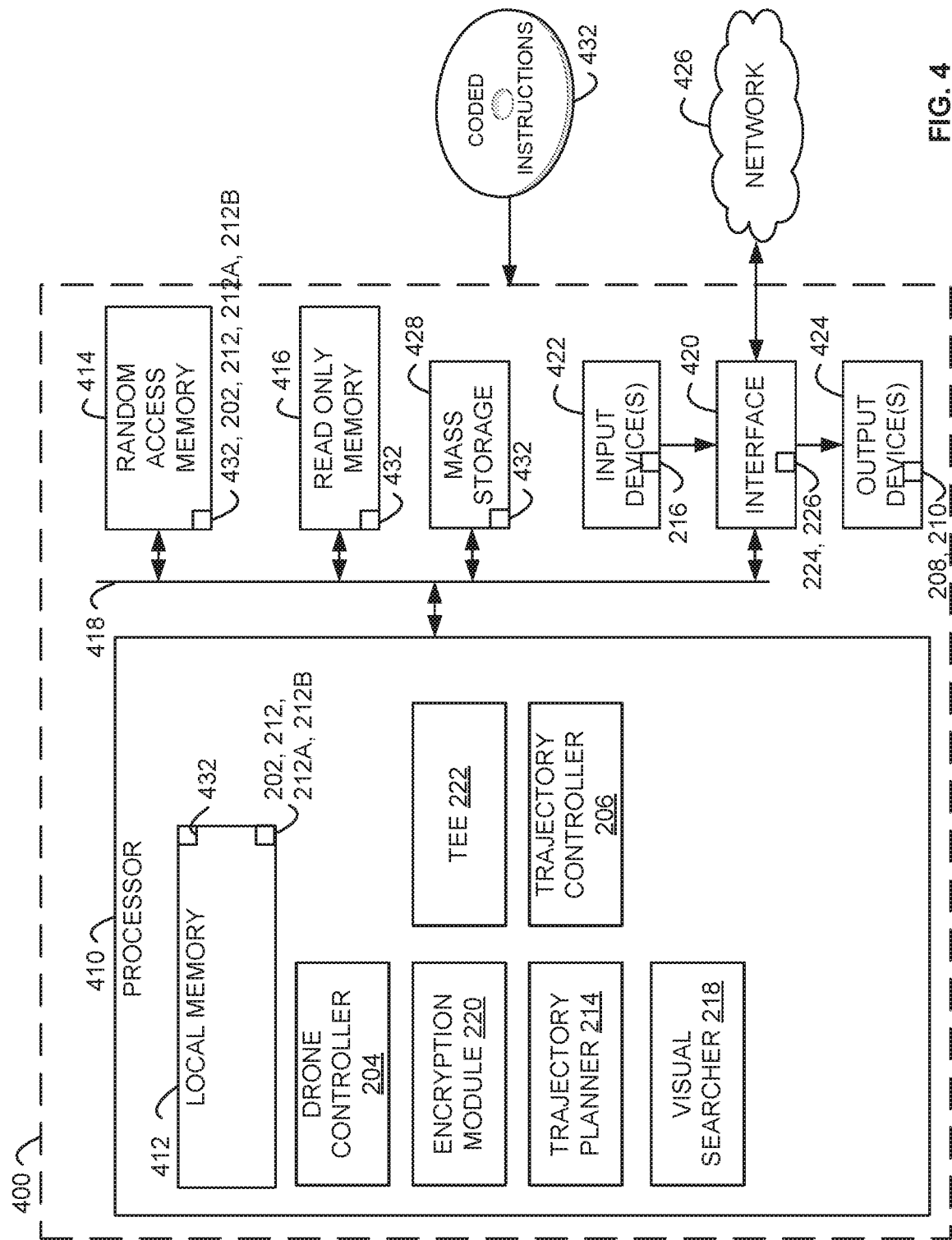
FIG. 4 illustrates an example processor platform structured to execute the example machine-readable instructions of FIG. 3 to implement the example drone of FIGS. 1 and/or 2.

FIG. 4 is a block diagram of an example processor platform 400 structured to execute the instructions and the interactions of FIG. 3 to implement the drone 100 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 410. The processor 410 of the illustrated example is hardware. For example, the processor 410 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the drone controller 204, the trajectory controller 206, the trajectory planner 214, the visual searcher 218, the encryption module 220, and the TEE 222.

The processor 410 of the illustrated example includes a local memory 412 (e.g., a cache). The processor 410 of the illustrated example is in communication with a main memory including a volatile memory 414 and a non-volatile memory 416 via a bus 418. The volatile memory 414 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 416 may be implemented by flash memory and/or any other desired type of memory device. Access to the main memory 414, 416 is controlled by a memory controller. In this example, the local memory 412 and/or the random-access memory 414 store the visual marker(s) 202, and the flight paths 212, 212A and 212B.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface. In this example, the interface circuit 420 includes the user interface(s) 226

In the illustrated example, one or more input devices 422 are connected to the interface circuit 420. The input device(s) 422 permit(s) a user to enter data and/or commands into the processor 410. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 422 include the camera(s) 216.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor. In this example, the output device(s) 424 include the motor(s) 208 and the control surface(s) 210.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 420 includes the communication interface(s) 224.

The processor platform 400 of the illustrated example also includes one or more mass storage devices 428 for storing software and/or data. Examples of such mass storage devices 428 include floppy disk drives, hard drive disks, CD drives, Blu-ray disk drives, redundant array of independent disks (RAID) systems, and DVD drives.

Coded instructions 432 including the coded instructions and the interactions of FIG. 3 may be stored in the mass storage device 428, in the volatile memory 414, in the non-volatile memory 416, and/or on a removable non-transitory computer-readable storage medium such as a CD-ROM or a DVD.

Drones and methods to deliver payloads to private locations are disclosed herein. Further examples and combinations thereof include at least the following.

Example 1 is a drone that includes:
a first communication interface to receive a first input from a sender representing a delivery area for a payload;
a second communication interface to receive a second input from a recipient representing a visual marker of the recipient, the visual marker unknown to the sender;
a drone controller to, when the drone reaches the delivery area, visually identify a location in the delivery area to deliver the payload based on the visual marker; and
a payload carrier to transport the payload to the location.

Example 2 is the drone of Example 1, further including:
a camera to provide visual information for a portion of the delivery area; and
a visual searcher to determine whether the visual marker appears in the visual information.

Example 3 is the drone of Example 2, further including a trajectory planner to define a search path to be followed by the drone as the camera provides the visual information and the visual searcher looks for the visual marker in the visual information.

Example 4 is the drone of Example 2, further including receiving, from the sender via the first communication interface, a search path to be followed by the drone as the camera provides the visual information and the visual searcher looks for the visual marker in the visual information.

Example 5 is the drone of Example 1, wherein the drone controller is to identify the location without being operated by the sender.

Example 6 is the drone of Example 1, wherein the second input is received at the second communication interface after the drone begins flying.

Example 7 is the drone of Example 1, wherein the drone controller is to, when the drone reaches the delivery area, identify the location based on at least one of the visual marker, or a second visual marker.

Example 8 is the drone of Example 1, wherein the drone controller is to prevent disclosure of at least one of the visual marker or the location to the sender.

Example 9 is the drone of Example 1, wherein the first communications interface is to discontinue communications with the sender while the drone controller is identifying the location to prevent disclosure of the location to the sender.

Example 10 is the drone of Example 1, wherein the first communications interface is to discontinue communications to prevent the sender from tracking the drone while the drone controller is identifying the location.

Example 11 is the drone of Example 1, further including an encryption module to:
form a private cryptographic key and a public cryptographic key;
send the public cryptographic key to the recipient, the second input encrypted with the public cryptographic key by the recipient; and
decrypt the second input using the private cryptographic key, the private cryptographic key unknown to the sender.

Example 12 is the drone of Example 1, further including a user interface to receive an identifier from the recipient, the carrier to deliver the payload if the identifier is valid.

Example 13 is method to deliver a payload from a sender to a recipient, the method including:
flying a drone from the sender to a delivery area based on a first location of the delivery area provided to the drone by the sender;
receiving an input representing a visual marker provided by the receiver, the visual marker kept private from the sender;
flying the drone over the delivery area to perform a search for a second location of the visual marker; and
delivering the payload to the second location.

Example 14 is the method of Example 13, further including:
defining a search path to be followed by the drone to search for the second location;
collecting visual information from above a portion of the delivery area while the drone flies the search path; and
determining whether the visual marker appears in the visual information.

Example 15 is the method of Example 13, wherein performing the search for the second location is based on at least one of the visual marker, or a second visual marker.

Example 16 is the method of Example 13, further including preventing disclosure of at least one of the visual marker or the second location to the sender.

Example 17 is the method of Example 13, further including:
forming a private cryptographic key and a public cryptographic key;
sending the public cryptographic key to the recipient, the second input encrypted with the public cryptographic key by the recipient; and
decrypting the second input using the private cryptographic key, the private cryptographic key unknown to the sender.

Example 18 is a non-transitory computer-readable storage medium comprising instructions that, when executed, cause a machine to:
fly a drone from the sender to a delivery area based on a first location of the delivery area provided to the drone by the sender;
receive an input representing a visual marker provided by the receiver, the visual marker kept private from the sender;
fly the drone over the delivery area to perform a search for a second location of the visual marker; and
deliver the payload to the second location.

Example 19 is the non-transitory computer-readable storage medium of Example 18, including instructions that, when executed, cause the machine to:
define a search path to be followed by the drone to search for the second location;
collect visual information from above a portion of the delivery area while the drone flies the search path; and
determine whether the visual marker appears in the visual information.

Example 20 is the non-transitory computer-readable storage medium of Example 18, including instructions that, when executed, cause the machine to prevent disclosure of at least one of the visual marker or the second location to the sender.

Example 21 is the non-transitory computer-readable storage medium of Example 18, including instructions that, when executed, cause the machine to:
form a private cryptographic key and a public cryptographic key;
send the public cryptographic key to the recipient, the second input encrypted with the public cryptographic key by the recipient; and
decrypt the second input using the private cryptographic key, the private cryptographic key unknown to the sender.

Example 22 is a drone, including:
a first communication interface to receive a first input from a sender representing a delivery area for a payload;
a second communication interface to receive a second input from a recipient representing a visual marker of the recipient, the visual marker unknown to the sender;
a drone controller to, when the drone reaches the delivery area, visually identify a location in the delivery area to deliver the payload based on the visual marker; and
a payload carrier to transport the payload to the location.

Example 23 is the drone of Example 22, further including:
a camera to provide visual information for a portion of the delivery area; and
a visual searcher to determine whether the visual marker appears in the visual information.

Example 24 is the drone of Example 23, further including a trajectory planner to define a search path to be followed by the drone as the camera provides visual information and the visual searcher looks for the visual marker in the visual information.

Example 25 is the drone of any of Examples 22 to 24, wherein the drone controller is to identify the location without being operated by the sender.

Example 26 is the drone of any of Examples 22 to 25, wherein the drone controller is to, when the drone reaches the delivery area, identify the location based on at least one of the visual marker, or a second visual marker.

Example 27 is the drone of any of Examples 22 to 26, wherein the drone controller is to prevent disclosure of at least one of the visual marker or the location to the sender.

Example 28 is the drone of any of Examples 22 to 27, wherein the first communications interface is to discontinue communications with the sender while the drone controller is identifying the location to prevent disclosure of the location to the sender.

Example 29 is the drone of any of Examples 22 to 28, wherein the first communications interface is to discontinue communications to prevent the sender from tracking the drone while the drone controller is identifying the location.

Example 30 is the drone of any of Examples 22 to 29, further including an encryption module to:

form a private cryptographic key and a public cryptographic key;

send the public cryptographic key to the recipient, the second input encrypted with the public cryptographic key by the recipient; and decrypt the second input using the private cryptographic key, the private cryptographic key unknown to the sender.

Example 31 is the drone of any of Examples 22 to 30, further including a user interface to receive an identifier from the recipient, the carrier to deliver the payload if the identifier is valid.

Example 32 is a method to deliver a payload from a sender to a recipient, the method including:

flying a drone from the sender to a delivery area based on a first location of the delivery area provided to the drone by the sender;

receiving an input representing a visual marker provided by the receiver, the visual marker kept private from the sender;

flying the drone over the delivery area to perform a search for a second location of the visual marker; and delivering the payload to the second location.

Example 33 is the method of Example 32, further including:

defining a search path to be followed by the drone to search for the second location;

collecting visual information from above a portion of the delivery area while the drone flies the search path; and determining whether the visual marker appears in the visual information.

Example 34 is the method of any of Examples 32 to 33, wherein performing the search for the second location is based on at least one of the visual marker, or a second visual marker.

Example 35 is the method of any of Examples 32 to 34, further including preventing disclosure of at least one of the visual marker or the second location to the sender.

Example 36 is the method of any of Examples 32 to 35, further including:

forming a private cryptographic key and a public cryptographic key;

sending the public cryptographic key to the recipient, the second input encrypted with the public cryptographic key by the recipient; and decrypting the second input using the private cryptographic key, the private cryptographic key unknown to the sender.

Example 37 is a non-transitory computer-readable storage medium comprising instructions that, when executed, cause a computer processor to perform the method of any of Examples 32 to 36.

Example 38 is a non-transitory computer-readable storage medium comprising instructions that, when executed, cause a machine to:

fly a drone from the sender to a delivery area based on a first location of the delivery area provided to the drone by the sender;

receive an input representing a visual marker provided by the receiver, the visual marker kept private from the sender;

fly the drone over the delivery area to perform a search for a second location of the visual marker; and deliver the payload to the second location.

Example 39 is the non-transitory computer-readable storage medium of Example 38, including instructions that, when executed, cause the machine to:

define a search path to be followed by the drone to search for the second location;

collect visual information from above a portion of the delivery area while the drone flies the search path; and determine whether the visual marker appears in the visual information.

Example 40 is the non-transitory computer-readable storage medium of Example 38 or 39, including instructions that, when executed, cause the machine to prevent disclosure of at least one of the visual marker or the second location to the sender.

Example 41 is a non-transitory computer-readable storage medium of any of Examples 38 to 40, including instructions that, when executed, cause the machine to:

form a private cryptographic key and a public cryptographic key;

send the public cryptographic key to the recipient, the second input encrypted with the public cryptographic key by the recipient; and decrypt the second input using the private cryptographic key, the private cryptographic key unknown to the sender.

Example 42 is a drone, comprising:

a means for receiving a first input from a sender representing a delivery area for a payload, and a second input from a recipient representing a visual marker of the recipient, the visual marker unknown to the sender;

a means for, when the drone reaches the delivery area, visually identifying a location in the delivery area to deliver the payload based on the visual marker; and a means for transporting the payload to the location.

Example 43 is the drone of Example 42, further including:

a means for collecting visual information a portion of the delivery area; and a means for determining whether the visual marker appears in the visual information.

Example 44 is the drone of Example 43, further including a means for defining a search path to be followed by the drone as the means for collecting collects visual information and the means for determining looks for the visual marker in the visual information.

Example 45 is the drone of any of Examples 42 to 44, wherein the means for identifying is to identify the location without being operated by the sender.

Example 46 is the drone of any of Examples 42 to 45, wherein the means for identifying is to prevent disclosure of at least one of the visual marker or the location to the sender.

Example 47 is the drone of any of Examples 42 to 46, wherein the means for receiving is to discontinue communications with the sender while the drone controller is identifying the location to prevent disclosure of the location to the sender.

Example 48 is the drone of any of Examples 42 to 47, wherein the means for receiving interface is to discontinue communications to prevent the sender from tracking the drone while the drone controller is identifying the location.

Example 49 is the drone of any of Examples 42 to 48, further including a means to:

form a private cryptographic key and a public cryptographic key;

send the public cryptographic key to the recipient, the second input encrypted with the public cryptographic key by the recipient; and decrypt the second input using the private cryptographic key, the private cryptographic key unknown to the sender.

Example 50 is the drone of any of Examples 42 to 49, further including a means to receive an identifier from the recipient, the carrier to deliver the payload if the identifier is valid.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A drone, comprising:
   a first communication interface to receive a first input from a sender, the first input to represent a delivery area for a payload;
   a second communication interface to receive a second input from a recipient, the second input to represent a visual marker of the recipient, the visual marker unknown to the sender;
   a drone controller to, when the drone reaches the delivery area, visually identify a location in the delivery area to deliver the payload based on the visual marker; and
   a payload carrier to transport the payload to the location.

2. The drone of claim 1, further including:
   a camera to provide visual information for at least a portion of the delivery area; and
   a visual searcher to determine whether the visual marker appears in the visual information.

3. The drone of claim 2, further including a trajectory planner to define a search path to be followed by the drone as the camera provides the visual information and the visual searcher looks for the visual marker in the visual information.

4. The drone of claim 2, further including receiving, from the sender via the first communication interface, a search path to be followed by the drone as the camera collects visual information and the visual searcher looks for the visual marker in the visual information.

5. The drone of claim 1, wherein the drone controller is to identify the location without being operated by the sender.

6. The drone of claim 1, wherein the second input is received at the second communication interface after the drone begins flying.

7. The drone of claim 1, wherein the visual marker is a first visual marker, the second input to identify both the first marker and a second visual marker, the drone controller to, when the drone reaches the delivery area, identify the location based on at least one of the first visual marker or the second visual marker.

8. The drone of claim 1, wherein the drone controller is to prevent disclosure of at least one of the visual marker or the location to the sender by disabling the first communication interface.

9. The drone of claim 1, wherein the first communications interface is to discontinue communications with the sender while the drone controller is identifying the location to prevent disclosure of the location to the sender.

10. The drone of claim 1, wherein the first communications interface is to discontinue communications to prevent the sender from tracking the drone while the drone controller is identifying the location.

11. The drone of claim 1, further including an encryption module to:
    form a private cryptographic key and a public cryptographic key;
    send the public cryptographic key to the recipient, the second input encrypted with the public cryptographic key by the recipient; and
    decrypt the second input using the private cryptographic key, the private cryptographic key unknown to the sender.

12. The drone of claim 1, further including a user interface to receive an identifier from the recipient, the carrier to deliver the payload if the identifier is valid.

13. A method to deliver a payload from a sender to a recipient, the method comprising:
    flying a drone from the sender to a delivery area based on a first location of the delivery area provided to the drone by the sender;
    receiving an input representing a visual marker provided by the recipient, the visual marker kept private from the sender;
    flying the drone over the delivery area to perform a search for a second location of the visual marker; and
    delivering the payload to the second location.

14. The method of claim 13, further including:
    defining a search path to be followed by the drone to search for the second location;
    collecting visual information from above a portion of the delivery area while the drone flies the search path; and
    determining whether the visual marker appears in the visual information.

15. The method of claim 13, wherein the visual marker is a first visual marker, the input to represent both the first visual marker and a second visual marker, and the performing of the search for the second location is based on at least one of the first visual marker or the second visual marker.

16. The method of claim 13, further including disabling a communications interface to prevent disclosure of at least one of the visual marker or the second location to the sender.

17. The method of claim 13, further including:
    forming a private cryptographic key and a public cryptographic key;
    sending the public cryptographic key to the recipient, the input encrypted with the public cryptographic key by the recipient; and
    decrypting the input using the private cryptographic key, the private cryptographic key unknown to the sender.

18. A non-transitory computer-readable storage medium comprising instructions that, when executed, cause a machine to:
    fly a drone from a sender to a delivery area based on a first location of the delivery area provided to the drone by the sender;
    receive an input representing a visual marker provided by a receiver, the visual marker kept private from the sender;
    fly the drone over the delivery area to perform a search for a second location of the visual marker; and
    deliver a payload to the second location.

19. The non-transitory computer-readable storage medium of claim 18, including instructions that, when executed, cause the machine to:
    define a search path to be followed by the drone to search for the second location;
    collect visual information from above a portion of the delivery area while the drone flies the search path; and determine whether the visual marker appears in the visual information.

20. The non-transitory computer-readable storage medium of claim 18, including instructions that, when executed, cause the machine to prevent disclosure of at least one of the visual marker or the second location to the sender by disabling communications with the sender while the drone is performing the search.

21. The non-transitory computer-readable storage medium of claim 18, including instructions that, when executed, cause the machine to:
    form a private cryptographic key and a public cryptographic key;
    send the public cryptographic key to the receiver, the input encrypted with the public cryptographic key by the receiver; and
    decrypt the input using the private cryptographic key, the private cryptographic key unknown to the sender.

22. A drone, comprising:
    means for receiving a first input from a sender representing a delivery area for a payload, and a second input from a recipient representing a visual marker of the recipient, the visual marker unknown to the sender;
    means for, when the drone reaches the delivery area, visually identifying a location in the delivery area to deliver the payload based on the visual marker; and
    means for transporting the payload to the location.

23. The drone of claim 22, further including:
    means for collecting visual information from above a portion of the delivery area; and
    means for determining whether the visual marker appears in the visual information.

24. The drone of claim 23, further including means for defining a search path to be followed by the drone as the means for collecting provides visual information, and the means for determining looks for the visual marker in the visual information.

* * * * *